W. SANDERSON.
HOISTING APPARATUS FOR VEHICLES.
APPLICATION FILED OCT. 16, 1918.

1,343,283.

Patented June 15, 1920
2 SHEETS—SHEET 1.

INVENTOR
William Sanderson
By Kay Totten Powell
attys

W. SANDERSON.
HOISTING APPARATUS FOR VEHICLES.
APPLICATION FILED OCT. 16, 1918.
1,343,283.
Patented June 15, 1920.
2 SHEETS—SHEET 2.
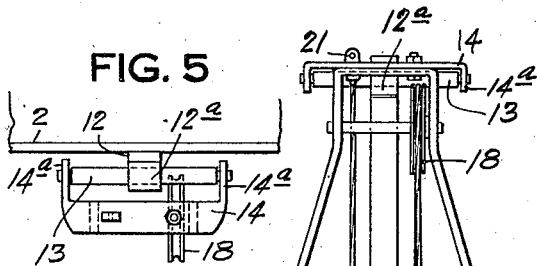
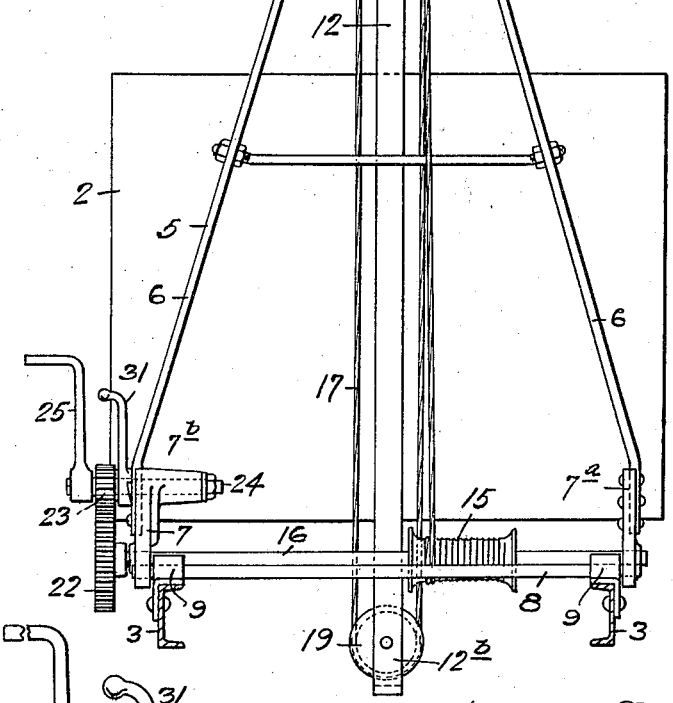
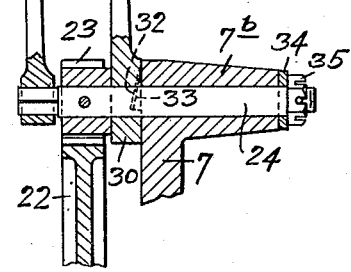
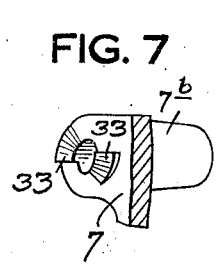
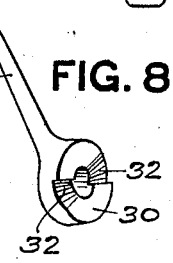
INVENTOR

UNITED STATES PATENT OFFICE.

WILLIAM SANDERSON, OF CONNEAUTVILLE, PENNSYLVANIA.

HOISTING APPARATUS FOR VEHICLES.

1,343,283.          Specification of Letters Patent.     Patented June 15, 1920.

Application filed October 16, 1918. Serial No. 258,358.

*To all whom it may concern:*

Be it known that I, WILLIAM SANDERSON, a citizen of the United States, and resident of Conneautville, in the county of Crawford and State of Pennsylvania, have invented a new and useful Improvement in Hoisting Apparatus for Vehicles; and I do hereby declare the following to be a full, clear, and exact description thereof.

My invention relates to dumping vehicles such as truck wagons, automobile trucks, and the like, more especially to hoisting apparatus for moving the body so that the contents will discharge therefrom.

The invention is directed to a type of hoisting apparatus such as shown in an application filed by me, Oct. 12, 1917, Serial No. 196,291. In such type of hoists in which the derrick is rigidly held against lateral movement of the body of the vehicle, the construction is open to the objection that if the vehicle happens to be standing on uneven ground when being dumped, the underframing will yield to adjust itself in conformity to the ground surface on which it stands and cause the body to be twisted and moved abnormally, and with it the rail, resulting in a binding friction between the rail and the derrick wheel which prevents operation of the lifting apparatus to dump the body.

The primary object of the invention is to provide hoisting apparatus for such vehicles which permits lateral shifting of the hoisting derrick with respect to the body of the vehicle, and vice versa, and in which the load of the vehicle naturally adjusts itself by gravity while being elevated or lowered without subjecting the parts to abnormal strains.

A further object is to provide simple hand-operated braking means whereby the lowering of the body or load may be conveniently controlled.

With these and other objects, as will hereinafter appear, the invention consists of the novel structural features as hereinafter set forth and claimed.

Figure 1:
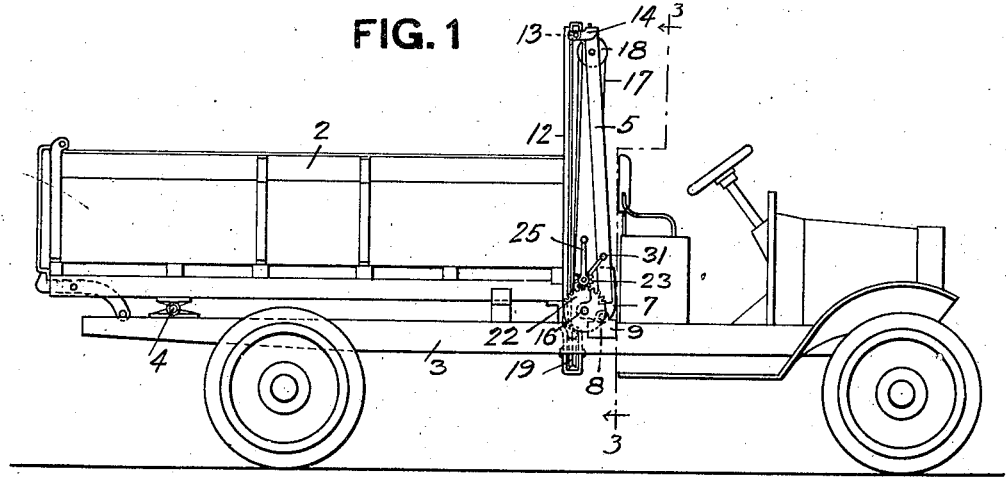
Figure 2:
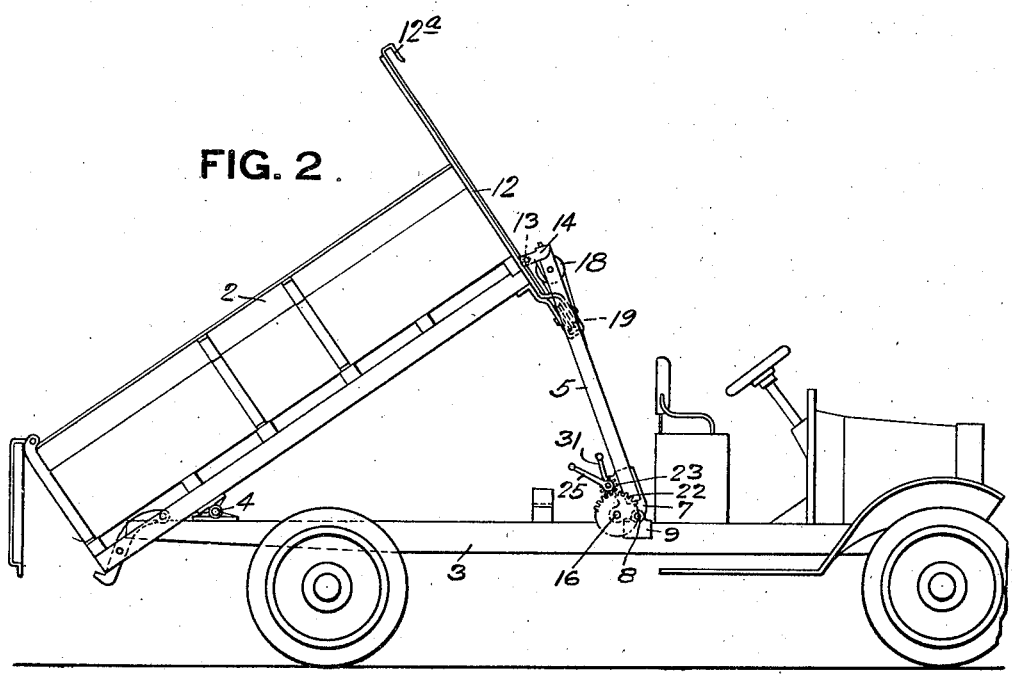

In the accompanying drawings, Figure 1 is a side elevation of a dumping vehicle embodying my invention with the body in normal lowered position; Fig. 2 is a like view with the body tilted or in dumping position; Fig. 3 is an enlarged transverse section on the line 3—3, Fig. 1; Fig. 4 is a side elevation of Fig. 3 looking from the left-hand side of the view; Fig. 5 is a plan view of the top of the derrick and a portion of the body. Figs. 6, 7 and 8 are enlarged detail views of the brake for controlling the lowering of the body.

In the drawings, I have illustrated my invention embodied in a dumping automobile truck, in which the numeral 2 designates the body of the vehicle which is pivoted to the chassis 3 by suitable hinge connections 4, the arrangement of the body with reference to the underframing being typical of this class of vehicles.

The hoisting apparatus comprises a derrick frame 5 mounted on the chassis in front of the body, between the body and the seat of the vehicle. The frame preferably is made of channel iron or flat bar material and formed substantially V-shaped, having the legs 6 which converge toward the top of the frame and which terminate in a yoke-like head to the derrick, the derrick being disposed centrally with reference to the central vertical plane of the vehicle.

The lower ends of the legs are connected to bearing members 7 and 7ª which are pivotally mounted one at each side of the frame on the ends of a shaft 8 which extends across and is journaled in bearings 9 on the frame.

The body of the vehicle is provided with a bearing supporting the derrick in load-sustaining position. This bearing preferably consists of a flat-faced rail 12 secured to the forward end of the body in central vertical position, and forms in effect a third leg to the derrick against which the derrick leans by engagement with a bearing on the head of the derrick. The rail extends up above the body of the vehicle and terminates at its upper end in a hook or yoke 12ª which is adapted to hook over the bearing on the head of the derrick when the body of the vehicle is seated on the chassis, and holds the derrick against pivotal movement. The lower end of the rail is provided with a bearing for the reception of a sheave around which the hoisting cable passes, said sheave forming the connecting means for the hoisting cable with the vehicle body. The bearing preferably is formed by bending the end of the rail into a loop or yoke 12ᵇ, which extends below the bottom of the body, the end portion of the rail terminating in a lateral projection 12ᶜ, which is bent under and fastened to the body. In this manner I provide a bearing for the sheave beneath the bottom of the body in which the bearing is braced in such manner as to prevent bending under lifting stress.

The bearing connection between the derrick and its supporting rail forms the main feature of the present invention, and is designed to form a support with the derrick to engage with the rail to take the thrust of the derrick in load-supporting position, and is so designed as to permit lateral shifting of the body and the derrick with respect to each other when the vehicle is subjected to strains which throw these parts out of normal alinement. The bearing consists of a long straight roller 13 which is journaled in a yoke 14 secured to the top of the derrick and forms throughout its length a bearing surface which permits lateral sliding movement on the rail or vice versa, the roller being of such length as to project beyond the rail at each side thereof and provides for supporting the derrick eccentric to its normal position. The yoke in which the roller is journaled has the end bearing portions 14$^a$ which extend beyond the diameter of the roller and form stops which are adapted to engage with the sides of the rail for limiting the lateral travel of the rail or of the derrick, and prevent abnormal travel of these parts and disengagement of the roller laterally of the rail when the vehicle is subjected to severe twisting strains.

The apparatus is provided with a winch type of cable mechanism connecting the derrick and the body for elevating and lowering the body into and out of dumping position. Said mechanism comprises a suitable cable winding drum 15 carried on a shaft 16 journaled in the bearings 7 and 7$^a$. A cable 17 is connected at one end to the drum, and extends up to a sheave 18 journaled in the head of the derrick, and passes down and around a sheave 19 journaled in a yoke 12$^b$ formed at the lower end of the rail 12, and then passes up again and is secured to the top of the derrick, as at 21.

The drum is rotated by simple power gearing consisting of a gear 22 fast on the shaft 16, said gear meshing with a pinion 23 secured to a stub shaft 24 which is journaled in a sleeve 7$^b$ of the member 7. The pinion is rotated by a crank handle 25 on the shaft 24.

An important feature of the invention is the provision of means for controlling the lowering of the body. In many instances it is desirable to return the body to normal position without dumping it, and ordinarily the operation is accomplished by knocking the holding pawl free, which pawl is commonly employed to lock the gears against reverse rotation, and allowing the body to damage to the truck. In some instances the load may be lowered by holding back on the crank handle, but this however, is a difficult and dangerous operation.

In my improved hoisting apparatus in lieu of the pawl commonly employed for holding, I provide braking means consisting of a friction disk 30 which is interposed between the relatively stationary or non-rotating member 7 and the pinion of the actuating shaft 24. The disk preferably is rotatably mounted on the pinion shaft and has the actuating handle 31, and is provided on its face, adjacent the member 7, with cam members formed as depressions 32 having cam faces which engage projecting cam lugs 33 on the member 7. The lugs 33 normally (during the hoisting operation) fit into the depressions of the disk, and allow the disk to be free of engagement endwise with the pinion. When, however, it is desirable to check the speed of the lowering body, the disk is rotated on the shaft in a direction which acts to force the cam faces 32 toward the cam faces 33, and through the camming action of the lugs or faces the disk is moved longitudinally on the shaft and is forced against the pinion, wedging itself between the pinion and the bearing member 7. The shaft is held in its bearing against longitudinal movement by the pinion at one end of the shaft, and by a washer and nut 34, 35 respectively at the opposite end, and when the disk is moved longitudinally thereon, friction is also created between the washer and the end of the bearing, thus providing powerful friction means which may be conveniently operated for controlling the speed of the descending body or for checking and holding the load suspended. It is to be noted that this camming action is in the opposite direction to the natural movement of the pinion, so that there is no liability of the cam faces locking together or jamming. Indeed, the wedging force is fully sufficient to hold the load upon the application of the brake even against the opposing strain upon the pinion.

It will be seen that with the above described bearing connection between the derrick and the rail, that great flexibility is provided between the body of the vehicle and the derrick, while at the same time the bearing affords the means for the stable support of the derrick for hoisting the load.

While I have described a particular embodiment of the invention, it is to be understood that the structural details may be varied within the scope of the appended claims.

What I claim is:—

1. In a dumping vehicle, the combination with the vehicle frame, of a body mounted mounted on the frame and including lifting mechanism, a rail and an unflanged bearing between the derrick and the body, the same being adapted to both longitudinal and lateral travel with relation to each other.

2. In a dumping vehicle, the combination with the vehicle frame, of a body mounted on the frame, means for moving the body to dumping position comprising a derrick mounted on the frame and including lifting mechanism, a rail disposed vertically on the end of the body, and an unflanged bearing on the derrick engaging the rail for supporting the derrick, the rail and bearing being adapted to both longitudinal and lateral travel with relation to each other.

3. In a dumping vehicle, the combination with the vehicle frame, of a body mounted on the frame, means for moving the body to dumping position comprising a derrick pivotally mounted on the frame and including lifting mechanism, a rail disposed vertically on the end of the body, and an unflanged bearing on the derrick engaging the rail for supporting the derrick normally centrally alined longitudinally with the rail and adapted for supporting the derrick laterally on either side of said central position.

4. In a dumping vehicle, the combination with the vehicle frame, of a body mounted on the frame, means for moving the body to dumping position comprising a derrick mounted on the frame and including lifting mechanism, a rail and an unflanged bearing between the derrick and body, one part thereof having a roller bearing engaging with the other part and providing for both longitudinal and lateral travel between said body and derrick.

5. In a dumping vehicle, the combination with the vehicle frame, of a body mounted on the frame, means for moving the body to dumping position comprising a derrick pivotally mounted on the frame and including lifting mechanism, a rail disposed vertically on the end of the body, and an unflanged roller bearing on the derrick engaging the rail for supporting the derrick, the rail and roller bearing being adapted to both longitudinal and lateral travel with relation to each other.

6. In a dumping vehicle, the combination with the vehicle frame, of a body mounted on the frame, means for moving the body to dumping position comprising a derrick mounted on the frame and including hoisting mechanism, a rail and an unflanged bearing between the derrick and body including a roller bearing between the same, said roller bearing being of a length greater than the width of the rail to allow of longitudinal and lateral travel between said elements.

7. In a dumping vehicle, the combination with the vehicle frame, of a body mounted on the frame, means for moving the body on its pivot to dumping position comprising a derrick pivotally mounted on the frame and including hoisting mechanism, a rail disposed vertically on the end of the body, and a roller bearing carried by the derrick adapted to contact with the rail, said roller having a bearing surface of a length greater than the width of the rail for supporting the derrick while allowing both longitudinal and lateral travel between the derrick and body.

8. In a dumping vehicle, the combination with the vehicle frame, of a body mounted on the frame, means for moving the body to dumping position comprising a derrick pivotally mounted on the frame and including hoisting mechanism, a rail disposed vertically on the end of the body, and a roller journaled in a bearing on the head of the derrick adapted to extend across and project beyond the rail on each side thereof to form a bearing for supporting the derrick against the rail.

9. In a dumping vehicle, the combination with the vehicle frame, of a body mounted on the frame, means for moving the body on its frame comprising a derrick mounted on the frame and including cable-winding mechanism, and a vertical rail on the end of the body, said rail having its lower end bent into a yoke-like frame for the reception of a cable sheave and thence extending to and terminating under the body and connected thereto.

In testimony whereof, I, the said WILLIAM SANDERSON, have hereunto set my hand.

WILLIAM SANDERSON.

Witnesses:
FLORENCE V. KEPHART,
S. F. ARMSTRONG.